H. O. LOSCH.
PROTRACTOR.
APPLICATION FILED JAN. 11, 1908.
901,113.
Patented Oct. 13, 1908.
2 SHEETS—SHEET 1.
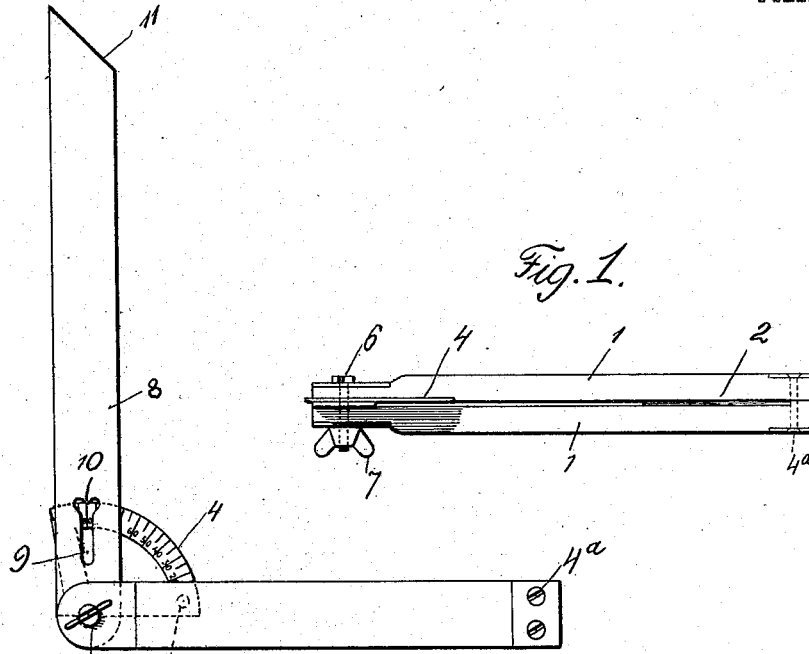
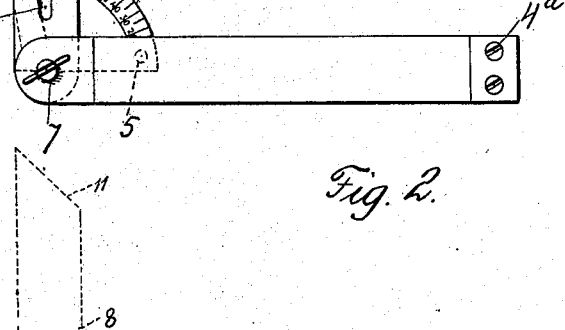
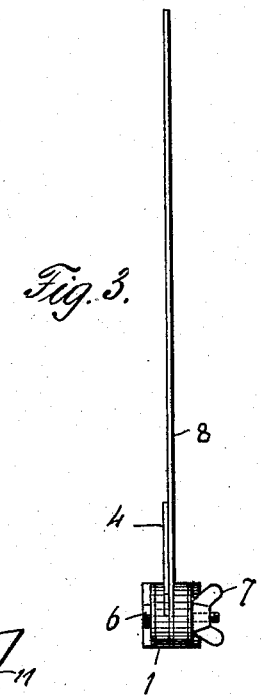
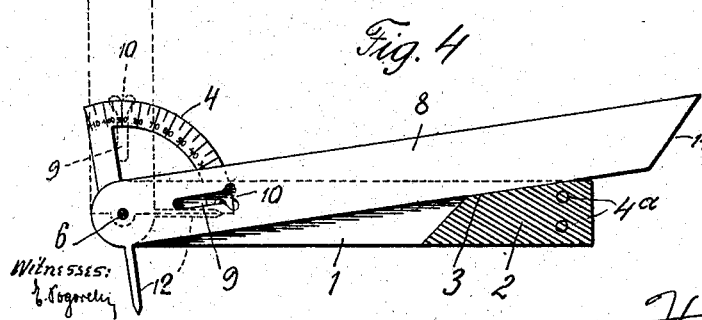
Inventor
H. O. LOSCH,

H. O. LOSCH.
PROTRACTOR.
APPLICATION FILED JAN. 11, 1908.

901,113.

Patented Oct. 13, 1908.

2 SHEETS—SHEET 2.

Witnesses
Inventor
H. O. LOSCH,
By
Attorneys

UNITED STATES PATENT OFFICE.

HENRY O. LOSCH, OF McKEES ROCKS, PENNSYLVANIA.

PROTRACTOR.

No. 901,113.　　　　Specification of Letters Patent.　　　Patented Oct. 13, 1908.

Application filed January 11, 1908. Serial No. 410,377.

*To all whom it may concern:*

Be it known that I, HENRY O. LOSCH, a citizen of the United States of America, residing at McKees Rocks, in the county of Allegheny and State of Pennsylvania, have invented certain new and useful Improvements in Protractors, of which the following is a specification, reference being had therein to the accompanying drawing.

This invention relates to a compound instrument particularly designed as an instrument of precision, wherein a square and protractor are combined.

The primary object of my invention is, to provide a square with a protector, whereby an angle can be quickly and accurately obtained.

A further object of this invention is to provide an instrument that can be used by carpenters, mechanics and similar artisans, the instrument being easily adjusted, and of such a construction as to occupy a comparatively small space in a tool box or kit.

With the above and other objects in view which will more readily appear as the invention is better understood, the same consists in the novel construction, combination and arrangement of parts to be hereinafter more fully described, and then specifically pointed out in the appended claims.

Figure 5:
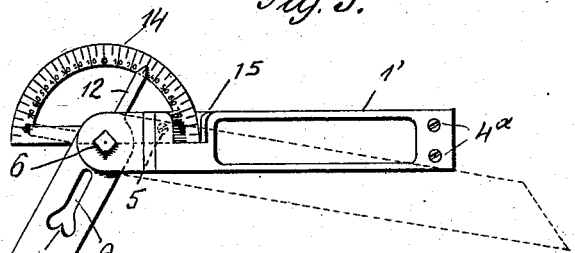
Figure 6:
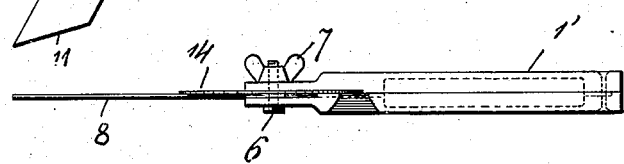
Figure 7:
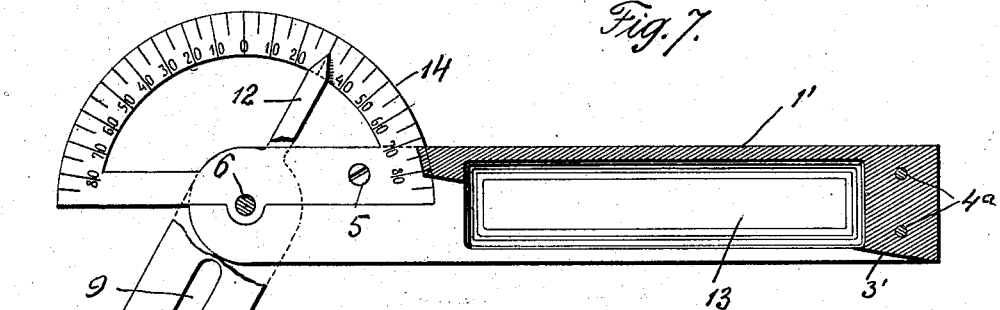
Figure 8:
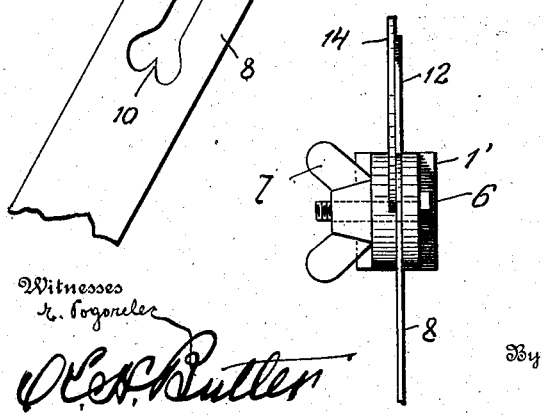

In the drawings: Figure 1 is a plan of my instrument as designed for carpenters, Fig. 2 is an elevation of the same, Fig. 3 is an edge view of the instrument, Fig. 4 is a longitudinal sectional view of the instrument, Fig. 5 is an elevation of my instrument as designed for mechanics, Fig. 6 is a plan of the same, Fig. 7 is an enlarged longitudinal sectional view of the instrument, partly broken away, and Fig. 8 is an edge view of the same.

To put my invention into practice, I construct my instrument of a blade body, a pivot blade, and a protractor, these three elements being arranged whereby the blade can be easily and quickly adjusted with relation to the blade body and the protractor.

The blade body as illustrated in Figs. 1 to 4 inclusive is constructed of two plates 1 between which is interposed a spacer block 2 having an inclined face 3. At the spacer block end of the body, the plates 1 are connected together by screws or rivets 4ª.

Secured to the confronting face of one of the plates 1, at the opposite end thereof, is a quadrant-shaped protractor 4, this protractor being held by screws 5 and 6, the latter being provided with a winged thumb nut 7, whereby the ends of the plates 1 can be sprung together, to frictionally hold a blade 8 loosely mounted upon the screw 6. The blade 8 is provided with a suitable opening or slot 9 providing a pointer 10 adapted to register with the graduation of the protractor 4. The free end of the blade 8 is beveled, as at 11, while the opposite end thereof is provided with a pointer or arm 12, said pointer or arm being at right angles to the blade 8.

The instrument as illustrated in Figs. 5 to 8 inclusive is particularly designed for a mechanic, and in this instance the blade body is made of metal and the confronting faces of the plates 1′ recessed as at 13 to reduce the weight of the blade body. A semi-circular protractor 14 is used, and instead of the pointer or arm 12 being at right angles to the blade 8, it is formed upon the longitudinal axis of said blade.

In order that the graduations at the inner end of the protractor 14 can be readily observed one of the plates 1′ is cut away, as at 15.

In either instrument, the pointer or arm 12 is adapted to move over the protractor as the pointer 10 elevates the same, and by this arrangement of the pointers or indicators, I am enabled to quickly adjust the instrument and position the blade 1 at any desired angle to the blade body. It is apparent that when the blade lies partially within the blade body, that the instrument occupies a comparatively small space.

I do not care to confine myself to the material from which the instrument is made or to its size or proportion. Such other changes as are permissible by the appended claims can be resorted to without departing from the spirit or scope of the invention.

Having now described my invention what I claim as new, is:—

1. An instrument of the type described comprising a blade body, a spacing block in said body having an inclined face, a protractor carried by said body, a blade adjustably mounted in said body and adapted when folded to rest on the inclined face of said spacing block, said blade having a slot formed therein providing a pointer adapted to register with the graduations of said protractor, and a pointer carried by said blade and adapted to move into engagement with said protractor when the first mentioned pointer moves out of engagement therewith.

2. An instrument of the type described comprising a body, a blade adjustably mounted therein and adapted to fold partially within said body, a protractor carried by said body, said blade having a pointer to register with said protractor, and another pointer carried by said blade and adapted to move into engagement with said protractor as the first mentioned pointer moves out of engagement therewith.

In testimony whereof I affix my signature in the presence of two witnesses.

HENRY O. LOSCH.

Witnesses:
MAX H. SROLOVITZ,
C. V. BROOKS.